E. KINDLER.
SUSPENSION DEVICE FOR TROLLEY WIRES.
APPLICATION FILED AUG. 9, 1911.

1,022,143.

Patented Apr. 2, 1912.

WITNESSES:

INVENTOR:
Edward Kindler,
BY
ATTORNEYS.

UNITED STATES PATENT OFFICE.

EDUARD KINDLER, OF FRIEDENAU-BERLIN, GERMANY.

SUSPENSION DEVICE FOR TROLLEY-WIRES.

1,022,143.  Specification of Letters Patent.  Patented Apr. 2, 1912.

Application filed August 9, 1911. Serial No. 643,137.

*To all whom it may concern:*

Be it known that I, EDUARD KINDLER, a subject of the Emperor of Germany, residing at 12 Lauterstrasse, Friedenau-Berlin, Germany, have invented certain new and useful Improvements in Suspension Devices for Trolley-Wires; and I do hereby declare the following to be a full, clear, and exact description of the invention, such as will enable others skilled in the art to which it appertains to make and use the same.

Figure 8:
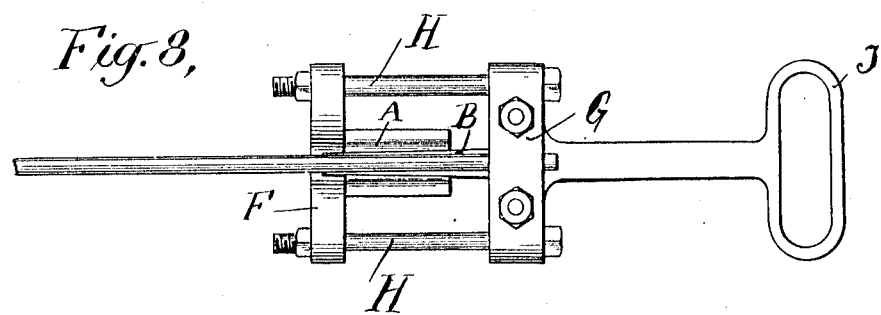

This invention is directed to suspension devices for trolley wires the cross section of which resembles generally a figure 8. The characteristic features of the trolley wire to which this invention is adaptable are an upper undercut portion which may be gripped by the suspension device, and a lower portion serving as a contact surface for the trolley wheel, shoe, or other collecting device, this lower portion being usually of such diameter that the flanges of a trolley wheel running thereon are held away from the suspension clamps.

In trolley lines for electric railways, problems are presented where the free ends of the trolley wire must be joined, as in a splice, and where the free ends must be held without contact, as in circuit breakers and at the ends of the line. In these cases, the draft or lengthwise pull of the wire is, if anything, the greatest factor to be dealt with in suspending the wire, and an object of this invention is to provide an improved suspension device which does not surround the contact portion of the wire, and therefore one which is not subject to the shock of contact with the collecting device, and which will grip the wire without injuring it and successfully resist the draft present at such points of application, and which is applicable as well to intermediate points of suspension.

This invention consists in providing a rigid suspension block which has a tapered undercut groove, and an externally tapered wedge, curved in cross section to fit the inner walls of the before mentioned groove in the rigid block and which is interiorly shaped to fit, tightly grip and underclutch the upper portion only of the wire, when the wedge, embracing that portion of the wire is forcibly thrust into the tapered groove in the block.

The term "underclutch" is used to define the embrace of the wire by the wedge in a manner similar to that in which the hand would clutch an undercut piece so that the fingers would reach below the undercut portions of both sides but not meet underneath.

In the accompanying drawing, the invention is shown as applied in practical trolley construction.

Figure 1:
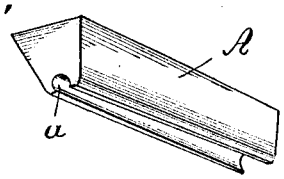
Figure 3:
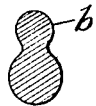
Figure 2:
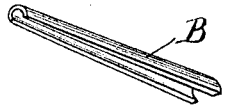
Figure 4:
Figure 5:
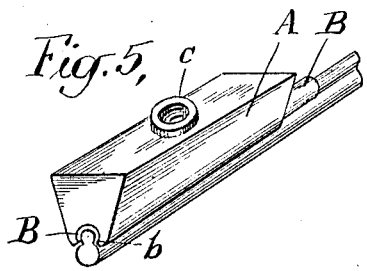
Figure 6:
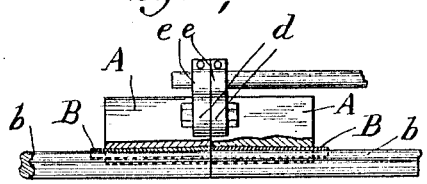
Figure 7:
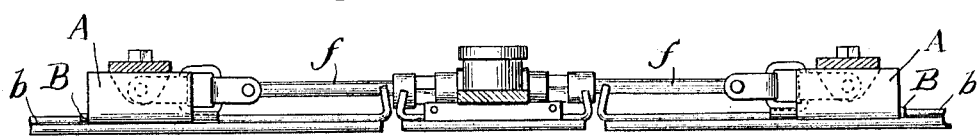

Figure 1 is a view in perspective of the rigid suspension block or hanger. Fig. 2 is a similar view of the curved wedge. Fig. 3 is a cross sectional view of an 8-shaped trolley wire. Fig. 4 is a similar view of a trolley wire of slightly different form known as grooved wire. Fig. 5 is a view in perspective showing the application of the device forming the subject matter of this invention to the end of an 8-shaped wire. Fig. 6 is a splice in which this device is employed. Fig. 7 is a circuit breaker or section-insulator also employing this device, and Fig. 8 is a tool for applying the suspension block to the wire.

Referring to the drawing, a suspension block indicated by the letter A, is preferably tapered downwardly to a narrow face in which the tapered undercut groove $a$ is provided, and has a threaded hole $c$ in its upper face for attachment to an insulator or other part of the suspension system.

A tapered wedge B made of metal or other suitable material has a tapered outer surface closely conforming to the inner wall of the groove $a$ in the block A, and an inner straight surface which closely conforms to the particular shape of the upper portion $b$ of the wire (see Fig. 3) that is, that portion of the wire to which the suspension device is to be applied. This wedge is designed to embrace this upper portion $b$ so as to underclutch it and support the wire when the wedge B is forced home in the groove $a$ in the block A. The wedge B bears such a relation to the direction of pull upon the wire that the draft upon the wire always tends to pull the wedge into the groove $a$ and tighten its grip upon the wire.

When this suspension device is applied to the wire at the points between its ends it is necessary to open up the wedge B somewhat to allow of its application to the wire, the wedge being closed upon the wire when it is subsequently forced home in the groove $a$.

Various applications of the device are illustrated in the drawings. In Fig. 8 a tool is shown for applying the block and wedge, In this instance, the block A is seated against a cross piece F and another cross piece G engages the wedge B already entered in the groove a. The cross pieces are drawn together by bolts H to force the block and wedge together. A suitable come-along handle I is provided on the tool.

In Fig. 6 I have illustrated a splice in which case the blocks A are provided with ears d and clamps e for securing them together and to the suspension system.

In Fig. 7, the suspension device is shown applied to a circuit breaker and the blocks A are provided with suitable means for the attachment of the rods f of the insulated connector.

Having thus described my invention what I claim is:

A suspension device for trolley wires, comprising a suspension block, provided with a tapered undercut groove, and a wedge having an outer surface shaped to engage said groove and having an inner groove shaped to underclutch a portion of the wire; substantially as described.

In testimony whereof I affix my signature, in presence of two witnesses.

EDUARD KINDLER.

Witnesses:
 HENRY HASPER,
 WOLDEMAR HAUPT.

Copies of this patent may be obtained for five cents each, by addressing the "Commissioner of Patents, Washington, D. C."